(12) United States Patent
Melander et al.

(10) Patent No.: US 10,237,145 B2
(45) Date of Patent: Mar. 19, 2019

(54) METHOD AND ARCHITECTURE FOR DISTRIBUTED CLOUD DOMAINS

(71) Applicant: TELEFONAKTIEBOLAGET L M ERICSSON (PUBL), Stockholm (SE)

(72) Inventors: Bob Melander, Sigtuna (SE); Hareesh Puthalath, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 482 days.

(21) Appl. No.: 14/993,673

(22) Filed: Jan. 12, 2016

(65) Prior Publication Data

US 2016/0127198 A1 May 5, 2016
US 2016/0373315 A9 Dec. 22, 2016

Related U.S. Application Data

(63) Continuation of application No. 14/389,563, filed as application No. PCT/IB2012/053086 on Jun. 19, 2012, now abandoned.

(60) Provisional application No. 61/636,012, filed on Apr. 20, 2012.

(51) Int. Cl.
*G06F 15/173* (2006.01)
*H04L 12/24* (2006.01)
*H04L 29/08* (2006.01)
*H04L 12/26* (2006.01)

(52) U.S. Cl.
CPC .......... *H04L 41/5041* (2013.01); *H04L 43/50* (2013.01); *H04L 67/10* (2013.01)

(58) Field of Classification Search
CPC ...... H04L 41/5041; H04L 43/50; H04L 67/10
USPC ......................................... 709/224
See application file for complete search history.

(56) References Cited

U.S. PATENT DOCUMENTS

2006/0233168 A1* 10/2006 Lewites ............... H04L 12/462
370/389
2012/0110055 A1* 5/2012 Van Biljon ............ G06Q 30/04
709/201

OTHER PUBLICATIONS

International Search Report issued in corresponding International application No. PCT/IB2012/053086, dated Feb. 13, 2013.
(Continued)

*Primary Examiner* — Frantz B Jean
(74) *Attorney, Agent, or Firm* — Patent Portfolio Builders PLLC

(57) ABSTRACT

An application, interface, device and method for coordinating a parameter across cloud domains of various distributed data centers. The method includes using an infrastructure service for generating one or more values of the parameter so that the values are different from each other; and providing the values to the respective cloud domains.

24 Claims, 6 Drawing Sheets

(56) References Cited

OTHER PUBLICATIONS

Written Opinion of the International Searching Authority issued in corresponding International application No. PCT/IB2012/053086, dated Feb. 13, 2013.
Li et al., "VSITE: A scalable and secure architecture for seamless L2 enterprise extension in the cloud," 2010 6th IEEE Workshop on Secure Network Protocols (NSPEC), Piscataway, NJ, USA, Oct. 5, 2010, pp. 31-36, XP031800480, DOI:10.1109/NPSEC.2010.5634451.
Radu Prodan et al., "A Survey and Taxonomy of Infrastructure as a Service and Web Hosting Cloud Providers," 2009 10th IEEE/ACM International Conference on Grid Computing, Piscataway, NJ, USA, Oct. 13, 2009, pp. 17-25, XP031580147, ISBN: 978-1-4244-5148-7.
Pedro A. Aranda Gutierrez; "SAIL: Defining the Interdomain Border in the Next Generation Internet"; Feb. 29, 2012; pp. 1-6.San Diego, CA.

* cited by examiner

METHOD AND ARCHITECTURE FOR DISTRIBUTED CLOUD DOMAINS

TECHNICAL FIELD

The present invention generally relates to systems, software and methods and, more particularly, to mechanisms and techniques for coordinated configuration, conflict resolution and arbitration across distributed cloud domains.

BACKGROUND

Cloud computing is the delivery of computing as a service rather than a product, whereby shared resources, software, and information are provided to computers and other devices as a utility over a network (e.g., the Internet). Cloud computing provided at various data centers.

This type of data center environment allows enterprises to get their applications up and running faster, with easier manageability and less maintenance, and enables information technology (IT) departments to more rapidly adjust IT resources (such as servers, storage, and networking) to meet fluctuating and unpredictable business demand.

In Infrastructure as a Service (IaaS), a basic cloud service model, the cloud providers offer to enterprises computers, as physical or more often as virtual machines, raw (block) storage, firewalls, load balancers, and networks. IaaS providers supply these resources to the enterprises, on demand, from their large pools installed in the data centers.

Cloud computing services are typically provided from remote data centers and they are accessed using the Internet. For an individual user (which may, for example, be an employee of an enterprise or a system operated by the enterprise), only one data center is involved at a time. However, in certain situations, e.g., to support applications with tight delay requirements or systems with limitations as to how they can be deployed, it may not be enough to rely on cloud resources or services provided by a single data center.

Thus, there are situations when two or more data centers are providing (simultaneously or not) the cloud resources to a single user or system. For these situations, there is a need to coordinate the configurations of those resources across the data centers. One example is when virtual machines with virtual network interfaces (vNICs) are deployed in different data centers and are interconnected, for example, with layer 2 services like virtual private Lan service (VPLS). The MAC addresses assigned to the vNICs need to be coordinated to avoid collisions. The MAC address is considered to be a parameter that needs to be coordinated across the data centers that provide the computing services. Similar collisions may arise for other parameters associated with other types of virtual resources or services.

Thus, there is a need to develop a mechanism or a method that coordinates these parameters across plural data centers for those services offered to a given user. Accordingly, it would be desirable to provide devices, systems and methods that avoid the afore-described problems and drawbacks.

SUMMARY

The cloud domains are offered to enterprises for satisfying their computing needs. However, the cloud domains that span across various data centers present new problems, for example, the potential collisions of addresses belonging to different parts of the cloud domains. Thus, a coordination of various parameters characteristic for the different parts of the cloud domains is necessary.

According to one exemplary embodiment, there is a method for coordinating a parameter (P) across cloud domains (D1 to Dn) of various distributed data centers. The method includes generating in an infrastructure service plural values (P1 to Pn) of the parameter (P) so that the values (P1 to Pn) are different from each other; sending the plural values (P1 to Pn) to the respective cloud domains (D1 to Dn) belonging to the various data centers; verifying at the cloud domains (D1 to Dn) whether a corresponding value (P1 to Pn) generates an internal conflict; and accepting the value (P1 to Pn) if there is no internal conflict or sending back to the infrastructure service a conflict message if there is an internal conflict.

According to another exemplary embodiment, there is an infrastructure service application for coordinating a parameter (P) across cloud domains (D1 to Dn) of various data centers, the infrastructure service application being embedded into a computing device. The computing device includes a processor configured to generate plural values (P1 to Pn) of the parameter (P) so that the values (P1 to Pn) are different from each other; and an interface connected to the processor. The interface is configured to send the plural values (P1 to Pn) to the respective cloud domains (D1 to Dn) belonging to the various data centers. The cloud domains (D1 to Dn) verify whether a corresponding value (P1 to Pn) generates an internal conflict, and the cloud domains (D1 to Dn) accept the value (P1 to Pn) if there is no internal conflict or send back to the infrastructure service a conflict message if there is an internal conflict.

According to still another exemplary embodiment, there is a computer embedded infrastructure service interface for coordinating a parameter (P) across cloud domains (D1 to Dn) of various data centers. The interface is configured to generate plural values (P1 to Pn) of the parameter (P) so that the values (P1 to Pn) are different from each other; and send the plural values (P1 to Pn) to the respective cloud domains (D1 to Dn) belonging to the various data centers. The cloud domains (D1 to Dn) verify whether a corresponding value (P1 to Pn) generates an internal conflict; and accept the value (P1 to Pn) if there is no internal conflict or send back to the infrastructure service interface a conflict message if there is an internal conflict.

According to yet another exemplary embodiment, there is a method for coordinating a parameter (P) across cloud domains (D1 to Dn) of various data centers. The method includes distributing an infrastructure service as local infrastructure services to the corresponding cloud domains (D1 to Dn); generating at a first local infrastructure service a first value (P1) of the parameter (P) based on a first seed (S1); sending to a second local infrastructure service a seed list (SL) that includes the first seed (S1); generating at the second local infrastructure service a second seed (S2) that is different from the first seed (S1); generating at the second local infrastructure service a second value (P2) of the parameter (P) based on the second seed (S2); and sending to a third local infrastructure service the seed list (SL) that includes the first seed (S1) and the second seed (S2).

According to another exemplary embodiment, there is an infrastructure service embedded into a plurality of cloud domains (D1 to Dn) for coordinating a parameter (P) across the cloud domains (D1 to Dn) of various data centers. The infrastructure service includes a first local infrastructure service configured to generate a first value (P1) of the parameter (P) based on a first seed (S1); a second local infrastructure service configured to receive from the first local infrastructure service a seed list (SL) that includes the first seed (S1); the second local infrastructure service being configured to generate a second seed (S2) that is different from the first seed (S1) and to generate a second value (P2) of the parameter (P) based on the second seed (S2); and the second local infrastructure service is configured to send to a third local infrastructure service the seed list (SL) that includes the first seed (S1) and the second seed (S2).

According to another exemplary embodiment, there is a computer embedded infrastructure service interface for coordinating a parameter (P) across cloud domains (D1 to Dn) of various data centers. The interface is configured to distribute an infrastructure service as local infrastructure services to the corresponding cloud domains (D1 to Dn); generate at a first local infrastructure service a first value (P1) of the parameter (P) based on a first seed (S1); send to a second local infrastructure service a seed list (SL) that includes the first seed (S1); generate at the second local infrastructure service a second seed (S2) that is different from the first seed (S1); generate at the second local infrastructure service a second value (P2) of the parameter (P) based on the second seed (S2); and send to a third local infrastructure service the seed list (SL) that includes the first seed (S1) and the second seed (S2).

Thus, it is an object to overcome some of the deficiencies discussed in the previous section and to provide a mechanism and/or method that coordinates the values of one or more parameters of plural cloud domains across various data centers. One or more of the independent claims advantageously provides such a mechanism for coordinating the values of a parameter P.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of plural cloud domains. However, the novel embodiments are not limited to plural cloud domains, but may be applied to other types of devices or networks.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Before discussing the novel concepts, it is believed that some clarifications for some of the terms used herein are in order. The MAC address was indicated as an example of a parameter P that needs to be coordinated across the plural cloud domains. Other examples may include an IP address, a network mask, a sub-net mask, etc. Thus, the term parameter includes at least one or more of these examples. Further, a cloud domain is considered to be at least one of a cloud server, a data center, a wide area network (WAN), etc. Furthermore, although the following description refers to the coordination of a parameter P across the cloud domains, it is understood that the term "coordination" may imply conflict resolution, coordination of configurations, arbitration, etc.

Figure 1:
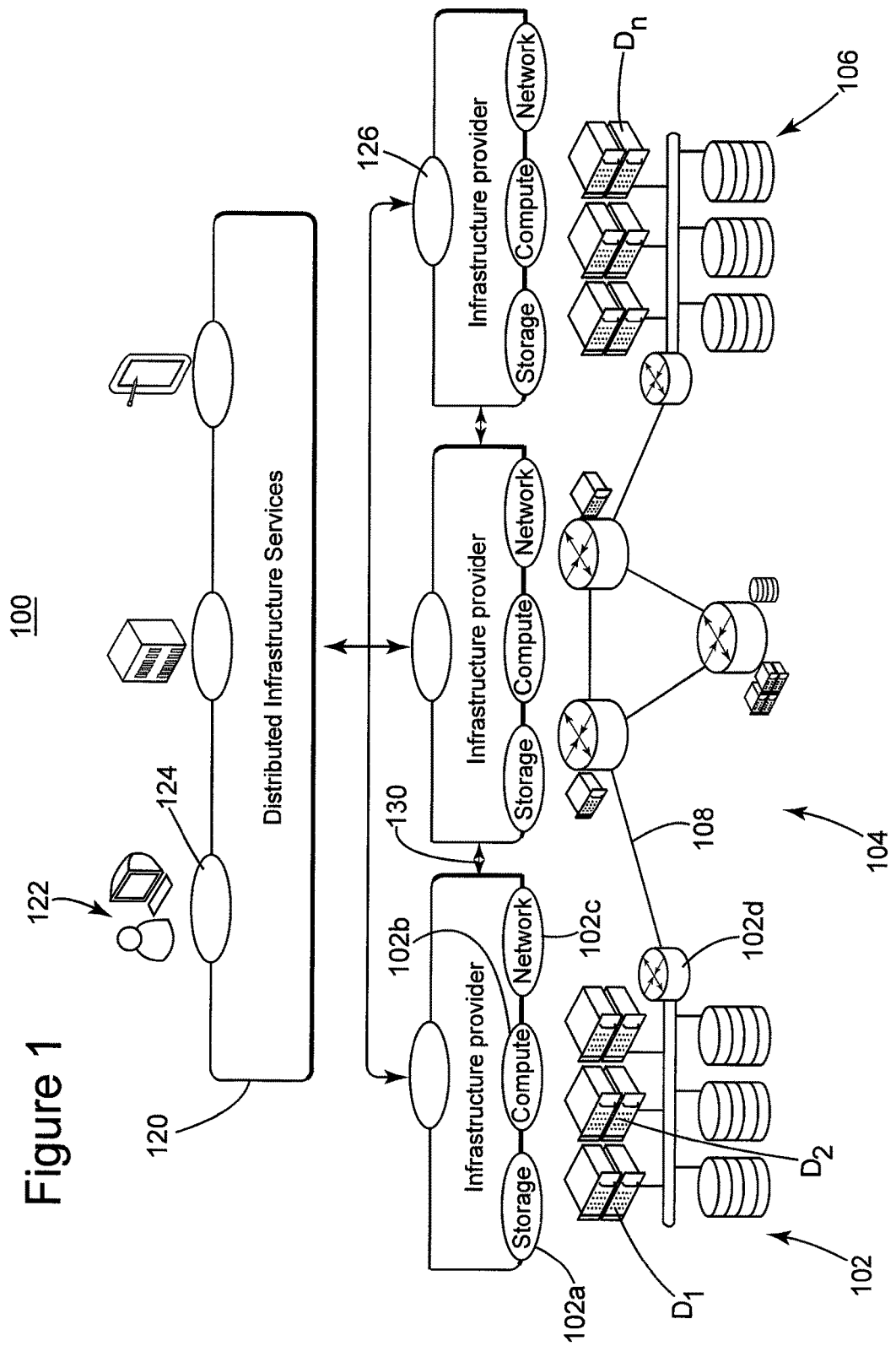
FIG. 1 is a schematic diagram illustrating plural cloud domains distributed across various date centers according to an exemplary embodiment.

According to an exemplary embodiment illustrated in FIG. 1, there is a system 100 that includes data centers 102, 104, and 106. The data centers may include n cloud domains: $D_1, D_2, \ldots, D_n$. A data center, for example 102, may include storage elements 102a, computing elements 102b, and networking elements 102c. Such a networking element may be a router 102d. These elements may be offered as a service to a given user (e.g., user 122). One or more physical links 108 may exist among the cloud domains for data exchange.

An infrastructure service 120 may be implemented (e.g., distributed), as a logical layer, at one or more of the cloud domains. FIG. 1 shows the infrastructure service 120 interacting with each of the data centers 102, 104 and 106. As will be discussed later, the infrastructure service 120 may be provided at only one cloud domain, distributed at all cloud domains or provided at a node unrelated to the cloud domains. The user 122 may interact with the infrastructure service 120 through a port 124. In other words, the user 122 may exchange data with the infrastructure service 120. Also, the infrastructure service 120 may interact through appropriate ports 126 with one or more of the domains $D_1$ to $D_n$. In addition, there is also a control plane channel (CPC) 130 among the cloud domains that can be used for negotiation of parameters or other configurations needed to provide a domain spanning service.

The infrastructure service 120 may be configured to use a function f, which given a seed s, can generate unique values in a given range for the parameter P that needs coordination, i.e., $P_i = f(s)$. For example, most operating systems like Linux have a random number generator as part of the operation system to let applications request random numbers as a service to be used in application contexts. Applications like webservers and databases use the random number generator to create sockets, in ssl connection. Truly random number generators are usually hardware based. In software like OS, generating random numbers is achieved by collecting entropy from device drivers, etc. But this approach usually takes time as enough noise need to be there for generating a next truly random number. A short-cut used by most applications and OSs, in which a truly random number is not needed, is to use a pseudo-random number generator. This is a mathematical function which can generate a series of numbers. This function needs a "seed" which initializes the mathematical function. The series of numbers generated depends on this "seed." Using a pseudo-random number generator is much faster when compared with a random number generator.

However, when creating a number of virtual machines (VMs) from the same image file, the seed for the pseudo-random number generator is the same. This could have negative implications from the application perspective, including security concerns. In other words, there is a need to ensure that the "seed" is unique. This problem is worsened in a multi-domain environment like in a shared virtual infrastructure.

Thus, according to a novel approach, the infrastructure service 120 is configured to generate unique seeds (and ensure their uniqueness) so that they can be passed down and configured as the initial value in the VMs for respective parameter values, as discussed next in more detail.

Irrespective of the implementation of the infrastructure service 120, because the function f is assumed to be known and agreed upon á priori by the different domains, the problem to solve is the agreement on unique seeds $s_i$ for each domain involved in the coordination of the parameter P.

Figure 2:
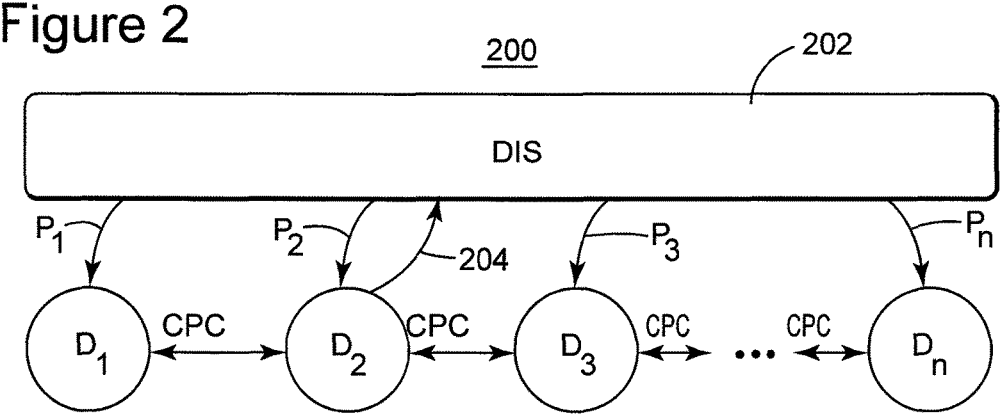
FIG. 2 is a schematic diagram of an infrastructure service provided at a node according to an exemplary embodiment.

According to a first approach illustrated in FIG. 2, a system 200 may have an infrastructure service 202 provided outside the domains $D_1$ to $D_n$, e.g., at an outside node or another location of the system 200. The function f provided at the infrastructure service 202 generates, based on one or more seeds, various parameters $P_i$ and provides them to corresponding domains $D_i$. In case that a domain, e.g., $D_2$, determines that its assigned parameter $P_2$ conflicts with existent parameters or other conditions, a conflict message 204 is sent to the infrastructure service 202. A new parameter value $P_2$ is generated at the infrastructure service 202 and the new value $P_2$ is again sent to the domain $D_2$. The new parameter value $P_2$ is generated so that there is no collision with the existent parameters $P_i$.

According to a second approach illustrated, for a system 300, in FIG. 3, the infrastructure service 302 is distributed at the domains $D_1$-$D_n$ and works in the following way. A local part $302_1$ of the infrastructure service 302, which is provided at domain $D_1$, generates, based on a seed s, plural values $P_1$ to $P_n$ for the parameter P. The local part $302_1$ provides the value $P_1$ to its host and the other values $P_2$ to $P_n$ to corresponding domains $D_2$ to $D_n$. More specifically, each domain $D_i$ has a local part $302_i$ that is configured to handle receiving and sending the value $P_i$. If a domain $D_2$ determines an internal conflict with the received value $P_2$, a conflict message 304 is sent to the local part $302_1$ for generating a new value $P_2$. Once a new value $P_2$ is generated, the local part $302_1$ communicates the new value to its corresponding local part $302_i$ to update the value $P_2$. The new parameter value $P_2$ is generated so that there is no collision with the existent parameters $P_i$.

Figure 4:
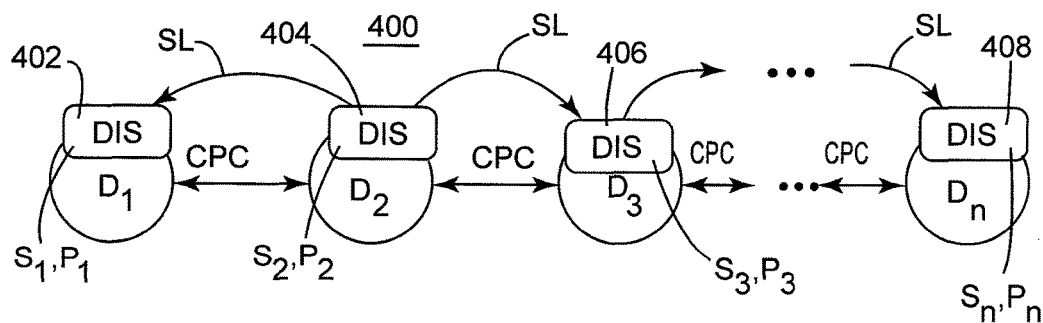
FIG. 4 is a schematic diagram of a distributed infrastructure service according to an exemplary embodiment.

According to a third approach illustrated, for a system 400, in FIG. 4, the infrastructure service is distributed at each domain and each infrastructure service part 402, 404, 406, 408 is responsible for generating a corresponding value for the parameter P. More specifically, the first infrastructure service part 402 is configured to generate the value $P_1$ based on a seed $s_1$. Different from the first and second approaches, the infrastructure service part 402 does not generate the values $P_i$ for the other domains. Instead, the infrastructure service part 402 communicates to the next infrastructure service 404 its seed $s_1$ in a seed list SL so that the infrastructure service 404 can generate a different seed $S_2$ and consequently, a corresponding value $P_2$. The process is repeated until all the infrastructure service parts have generated corresponding values $P_i$.

Figure 5:
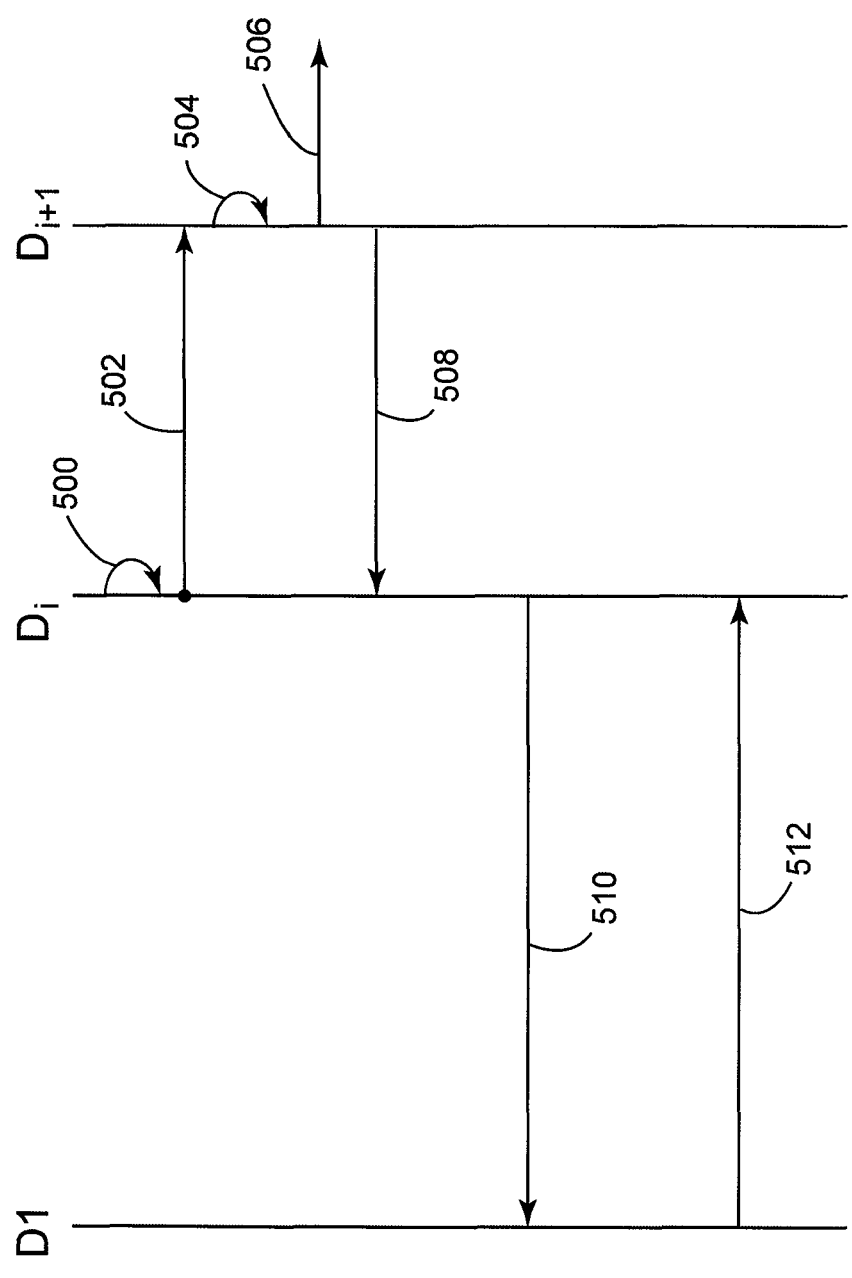
FIG. 5 is a schematic diagram illustrating messages exchanged among plural cloud domains when a value of a parameter is in conflict according to an exemplary embodiment.

If a domain $D_i$ determines that there is an internal conflict due to its value $P_i$, then the following process is followed for receiving a new value $P_i$. As illustrated in FIG. 5, when the domain $D_i$ determines in step 500 that there is an internal conflict related to its value $P_i$, a seed collect message is sent in step 502 to a next domain $D_{i+1}$ that was previously provided with the seed $s_i$ by the domain $D_i$. A seed list is provided with the seed collect message and the purpose of the seed list is to collect the seeds from all the domains after the domain $D_i$. Thus, the seed list initially includes the seed $s_i$ of the domain $D_i$ having the internal conflict. The next domain $D_{i+1}$ analyzes in step 504 whether it is the last domain in the chain of the domains. If the answer is no, the next domain $D_{i+1}$ adds its seed $s_{i+1}$ to the seed list and sends in step 506 the seed collect message to another next domain $D_{i+2}$ (not shown) until the last domain is reached.

However, if the next domain $D_{i+1}$ is the last domain, after adding its seed to the seed list, the next domain $D_{i+1}$ sends in step 508 a seed conflict message back to the domain $D_i$. The seed conflict message now includes the seed list with all the seeds of the domains $D_i$ to $D_n$. The domain $D_i$ sends in step 510 the seed conflict message back to the original domain $D_1$. In sending back the seed conflict message to the original domain $D_1$, the seed conflict message travels through each domain between $D_1$ and $D_i$ and each of these nodes is configured to add its own seed to the seed list included in the seed conflict message.

In this way, the initiating domain $D_1$ receives all the seeds of the other domains $D_2$ to $D_n$ and generates a new seed $s_i$ for domain $D_i$ so that the new seed $s_i$ does not conflict with the existing seeds. The new seed $s_i$ is then sent in step 512 from domain $D_1$ to domain $D_i$ through the intermediate domains as illustrated in FIG. 4.

Figure 3:
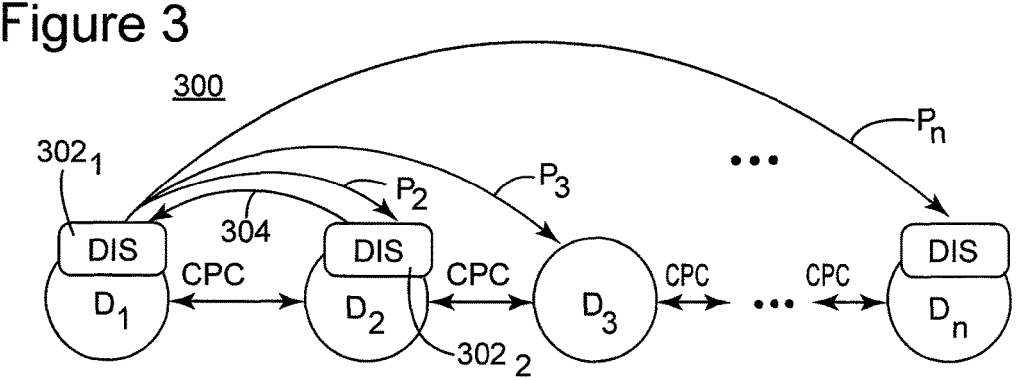
FIG. 3 is a schematic diagram of an infrastructure service provided at a cloud domain and configured to generate values of a parameter P according to an exemplary embodiment.
Figure 6:
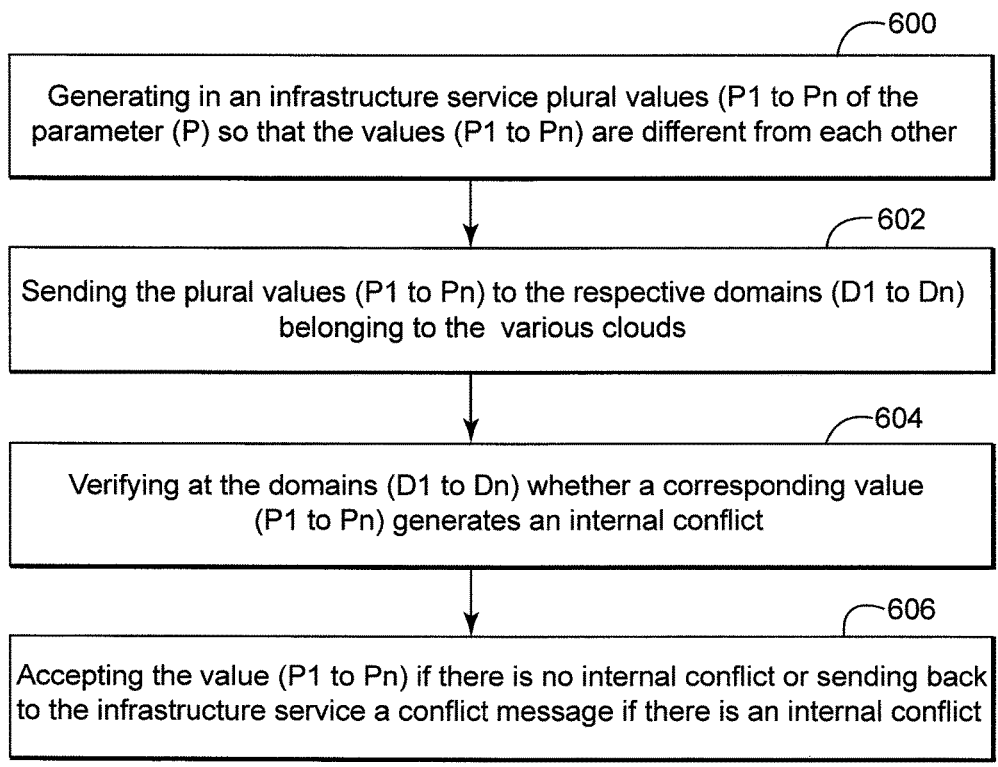
FIG. 6 is a flowchart of a method for generating plural values of a parameter P for plural cloud domains according to an exemplary embodiment.

A generic method for implementing the first and second approaches illustrated in FIGS. 2 and 3 is presented in FIG. 6. According to the flowchart illustrated in FIG. 6, there is a method for coordinating a parameter (P) across cloud domains (D1 to Dn) of various distributed data centers. The method includes a step 600 of generating in an infrastructure service, plural values (P1 to Pn) of the parameter (P) so that the values (P1 to Pn) are different from each other; a step 602 of sending the plural values (P1 to Pn) to the respective cloud domains (D1 to Dn) belonging to the various data centers; a step 604 of verifying at the cloud domains (D1 to Dn) whether a corresponding value (P1 to Pn) generates an internal conflict; and a step 606 of accepting the value (P1 to Pn) if there is no internal conflict or sending back to the infrastructure service a conflict message if there is an internal conflict.

Figure 7:
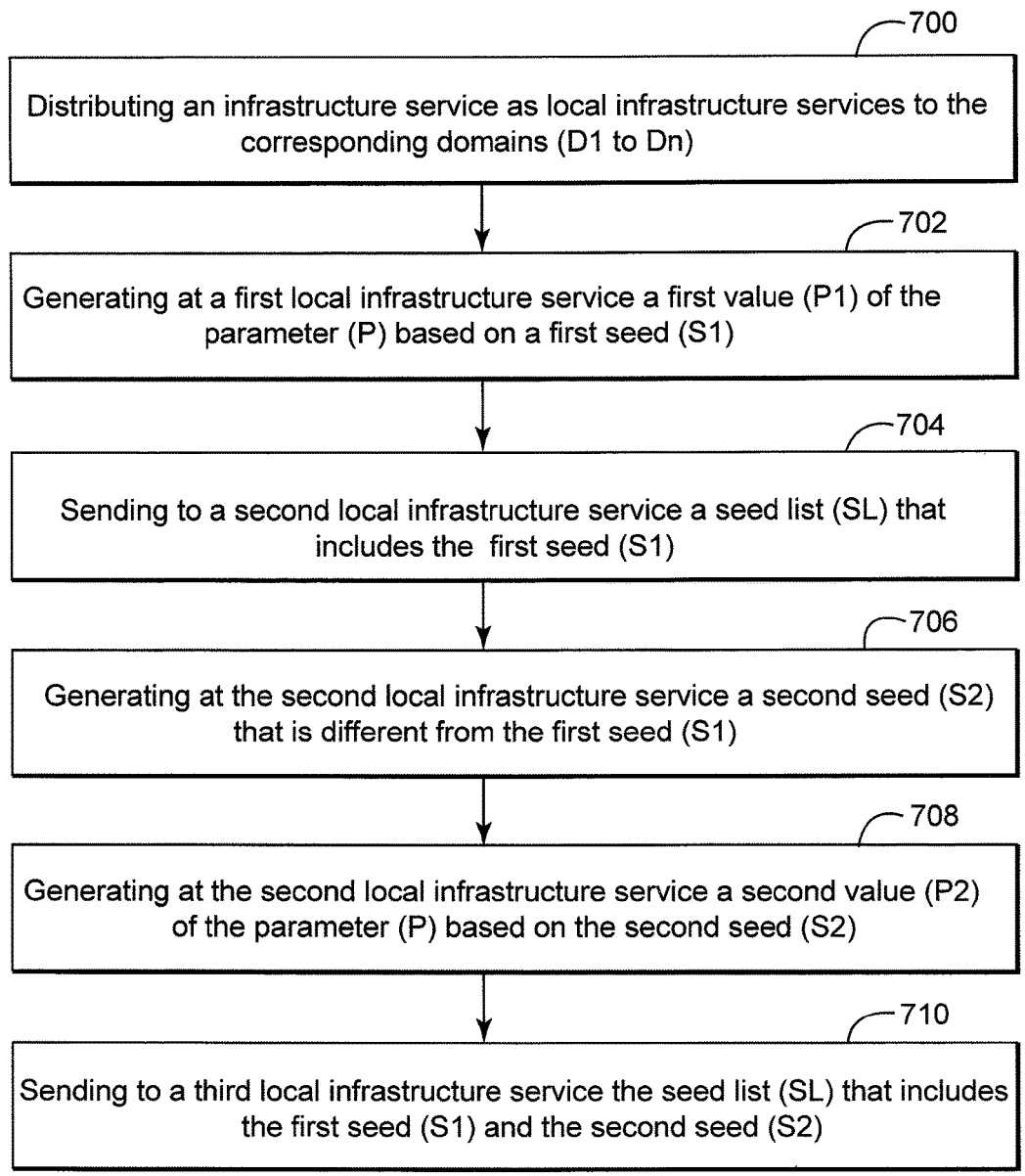
FIG. 7 is a flowchart of another method for generating plural values of a parameter P for plural cloud domains according to an exemplary embodiment.

A method for implementing the third approach is illustrated in FIG. 7. According to the flowchart of FIG. 7, there is a method for coordinating a parameter (P) across cloud domains (D1 to Dn) of various data centers. The method includes a step 700 of distributing an infrastructure service as local infrastructure services to the corresponding cloud domains (D1 to Dn); a step 702 of generating at a first local infrastructure service a first value (P1) of the parameter (P) based on a first seed (S1); a step 704 of sending to a second local infrastructure service a seed list (SL) that includes the first seed (S1); a step 706 of generating at the second local infrastructure service a second seed (S2) that is different from the first seed (S1); a step 708 of generating at the second local infrastructure service a second value (P2) of the parameter (P) based on the second seed (S2); and a step 710 of sending to a third local infrastructure service the seed list (SL) that includes the first seed (S1) and the second seed (S2).

Figure 8:
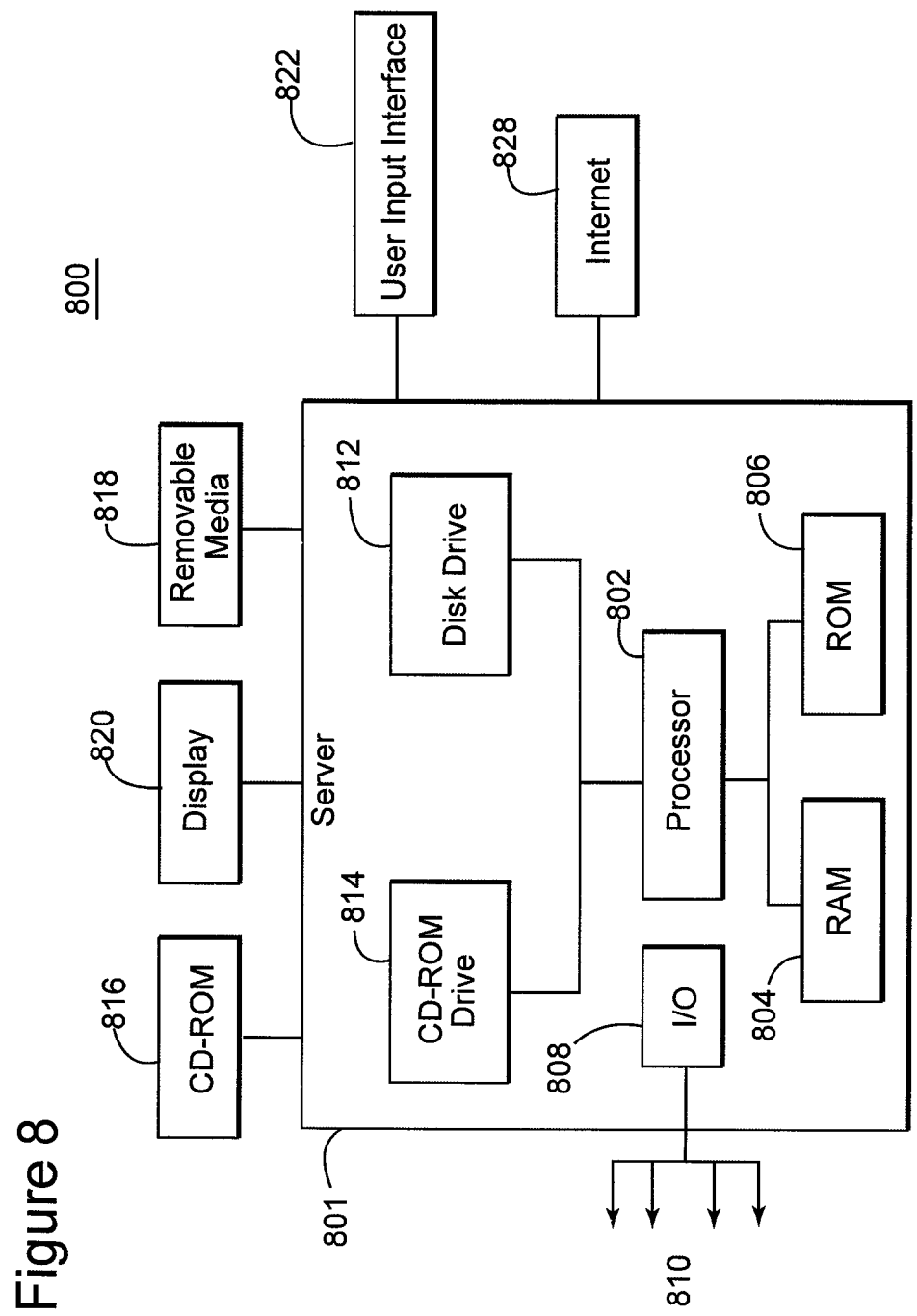
FIG. 8 is a schematic diagram of a node in which the methods of FIGS. 6 and/or 7 may be implemented.

For purposes of illustration and not of limitation, an example of a node (e.g., a cloud server or another computing device) capable of carrying out operations in accordance with the exemplary embodiments is illustrated in FIG. 8. Hardware, firmware, software or a combination thereof may be used to perform the various steps and operations described herein.

The exemplary node 800 suitable for performing the activities described in the exemplary embodiments may include or not a server 801. The infrastructure services discussed above may be implemented in the node 800, e.g., as a infrastructure service interface. Thus, the infrastructure service interface may include only software instructions or a combination of software and hardware components. The server 801 may include a central processor (CPU) 802 coupled to a random access memory (RAM) 804 and to a read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like. The processor 802 carries out a variety of functions as is known in the art, as dictated by software and/or firmware instructions.

The server 801 may also include one or more data storage devices, including hard and disk drives 812, CD-ROM drives 814, and other hardware capable of reading and/or storing information such as DVD, etc. In one embodiment, software for carrying out the above discussed steps may be stored and distributed on a CD-ROM 816, removable media 818 or other form of media capable of portably storing information. These storage media may be inserted into, and read by, devices such as the CD-ROM drive 814, the disk drive 812, etc. The server 801 may be coupled to a display 820, which may be any type of known display or presentation screen, such as LCD displays, LED displays, plasma display, cathode ray tubes (CRT), etc. A user input interface 822 is provided, including one or more user interface mechanisms such as a mouse, keyboard, microphone, touch pad, touch screen, voice-recognition system, etc.

The server 801 may be coupled to other cloud domains (which themselves may have the structure of the node 800), such as landline and/or wireless terminals, via a network. The server may be part of a larger network configuration as in a global area network (GAN) such as the Internet 828, which allows ultimate connection to the various landline and/or mobile client devices.

The disclosed exemplary embodiments provide a cloud domain, method and computer instructions for coordinating the values of one or more parameters across plural cloud domains. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for coordinating a parameter across cloud domains of various data centers, the method comprising:
   generating, in an infrastructure service, a plurality of values for the parameter, wherein each of the plurality of values are different from each other;
   sending each of the plurality of values to each of the cloud domains of the various data centers;
   verifying at each of the cloud domains whether a corresponding value generates an internal conflict; and
   accepting the corresponding value if there is no internal conflict or sending back to the infrastructure service a conflict message if there is an internal conflict.

2. The method of claim 1, wherein the infrastructure service is provided in a device that is not part of the cloud domains.

3. The method of claim 1, wherein the infrastructure service is implemented in at least one cloud domain of the cloud domains.

4. The method of claim 3, further comprising:
   generating various values of the parameter at the at least one cloud domain; and
   forwarding the various values of the parameter to remaining cloud domains of the various data centers.

5. The method of claim 1, further comprising:
   providing a seed to a function of the infrastructure service for automatically generating the plurality of values,
   wherein the function is configured to generate unique values based on the seed.

6. The method of claim 1, wherein the parameter is an address of an element of a cloud domain of the various data centers.

7. The method of claim 1, further comprising:
after receiving the conflict message for a given cloud domain indicative of the internal conflict, generating another value for the parameter for the given cloud domain; and
sending the another value to the given cloud domain.

8. An infrastructure service application for coordinating a parameter across cloud domains of various data centers, the infrastructure service application being embedded into a computing device, the computing device comprising:
a processor configured to generate a plurality of values for the parameter, wherein each of the plurality of values are different from each other; and
an interface connected to the processor and configured to send each of the plurality of values to each of the cloud domains of the various data centers,
wherein each of the cloud domains verify whether a corresponding value generates an internal conflict, and
the cloud domains accept the corresponding value if there is no internal conflict or send back to the infrastructure service application a conflict message if there is an internal conflict.

9. The computing device of claim 8, wherein the infrastructure service application is provided in a node that is not part of the various data centers.

10. The computing device of claim 8, wherein the infrastructure service application is implemented in at least one cloud domain of the various data centers.

11. The computing device of claim 10,
wherein the processor is further configured to generate various values of the parameter at the at least one cloud domain; and
the interface is further configured to forward the various values of the parameter to remaining cloud domains of the various data centers.

12. The computing device of claim 8, wherein the processor is further configured to provide a seed to a function of the infrastructure service application for automatically generating the plurality of values,
wherein the function is configured to generate unique values based on the seed.

13. The computing device of claim 8, wherein the parameter is an address of an element of a cloud domain of the various data centers.

14. The computing device of claim 8, wherein the processor is further configured to generate, after receiving the conflict message for a given cloud domain indicative of the internal conflict, another value for the parameter for the given cloud domain; and
the interface is configured to send the another value to the given cloud domain.

15. A computer embedded infrastructure service interface for coordinating a parameter across cloud domains of various data centers, the computer embedded infrastructure service interface being configured to:
generate a plurality of values for the parameter so that each of the plurality of values are different from each other; and
send each of the plurality of values to each of the cloud domains of the various data centers,
wherein each of the cloud domains verify whether a corresponding value generates an internal conflict; and
accept the corresponding value if there is no internal conflict or send back to the computer embedded infrastructure service interface a conflict message if there is an internal conflict.

16. The computer embedded infrastructure service interface of claim 15, being further configured to:
provide a seed to a function for automatically generating the plurality of values,
wherein the function is configured to generate unique values based on the seed.

17. The computer embedded infrastructure service interface of claim 15, wherein the parameter is an address of an element of a cloud domain of the various data centers.

18. A method for coordinating a parameter across cloud domains of various data centers, the method comprising:
distributing an infrastructure service as local infrastructure services to each of the cloud domains of the various data centers;
generating at a first local infrastructure service a first value of the parameter based on a first seed;
sending to a second local infrastructure service a seed list that includes the first seed;
generating at the second local infrastructure service a second seed that is different from the first seed;
generating at the second local infrastructure service a second value of the parameter based on the second seed; and
sending to a third local infrastructure service the seed list that includes the first seed and the second seed.

19. The method of claim 18, further comprising:
generating at the third local infrastructure service a third seed and a third value of the parameter, based on the first to third seeds.

20. The method of claim 19, further comprising:
sending the seed list to a next local infrastructure service;
generating a new seed and a new value of the parameter at the next local infrastructure service; and
repeating the steps of sending and generating until all the local infrastructure services have generated corresponding values for the parameter.

21. An infrastructure service, embedded in a plurality of cloud domains of various data centers, for coordinating a parameter across the plurality of cloud domains of various data centers, the infrastructure service comprising:
a first local infrastructure service configured to generate a first value of the parameter based on a first seed;
a second local infrastructure service configured to receive from the first local infrastructure service a seed list that includes the first seed;
the second local infrastructure service being configured to generate a second seed that is different from the first seed and to generate a second value of the parameter based on the second seed; and
the second local infrastructure service being configured to send to a third local infrastructure service the seed list that includes the first seed and the second seed.

22. The infrastructure service of claim 21, further comprising:
the third local infrastructure service being configured to generate a third seed and a third value of the parameter, based on the first to third seeds.

23. A computer embedded infrastructure service interface for coordinating a parameter across cloud domains of various data centers, the computer embedded infrastructure service interface being configured to:
distribute an infrastructure service as local infrastructure services to each of the cloud domains;
generate at a first local infrastructure service a first value of the parameter based on a first seed;
send to a second local infrastructure service a seed list that includes the first seed;

generate at the second local infrastructure service a second seed that is different from the first seed;

generate at the second local infrastructure service a second value of the parameter based on the second seed; and send to a third local infrastructure service the seed list that includes the first seed and the second seed.

24. The computer embedded infrastructure service interface of claim 23, further comprising:

a next local infrastructure service configured to receive from the third local infrastructure service the seed list;

the next local infrastructure service being configured to generate a new seed and a new value of the parameter; and further local infrastructure services being configured to receive and generate new values of the parameter until all local infrastructure services have generated corresponding values for the parameter.

* * * * *